Aug. 9, 1938.   G. PARDEKOOPER   2,125,950
CASING STRIPPING MACHINE
Filed July 7, 1934   2 Sheets-Sheet 1
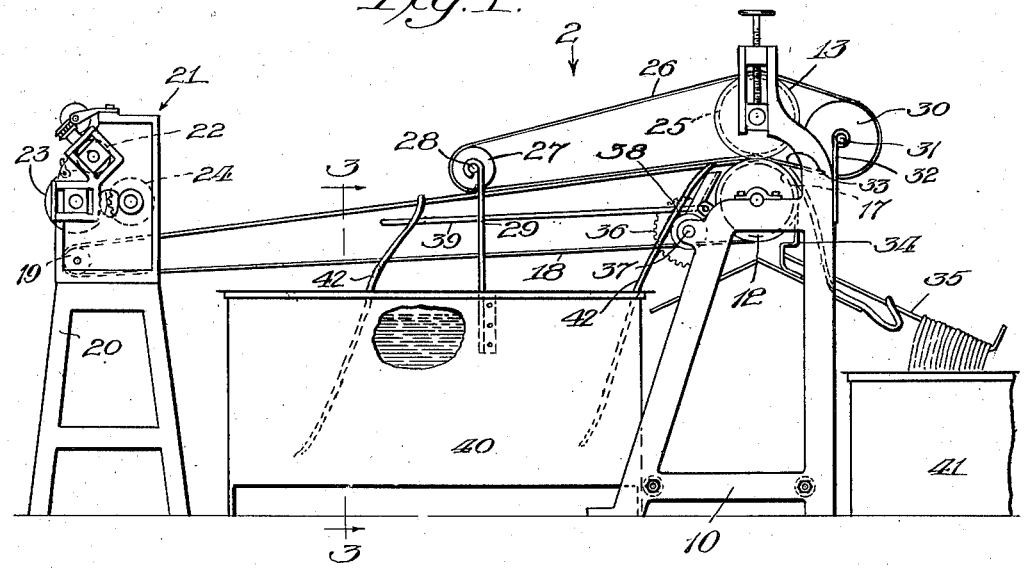
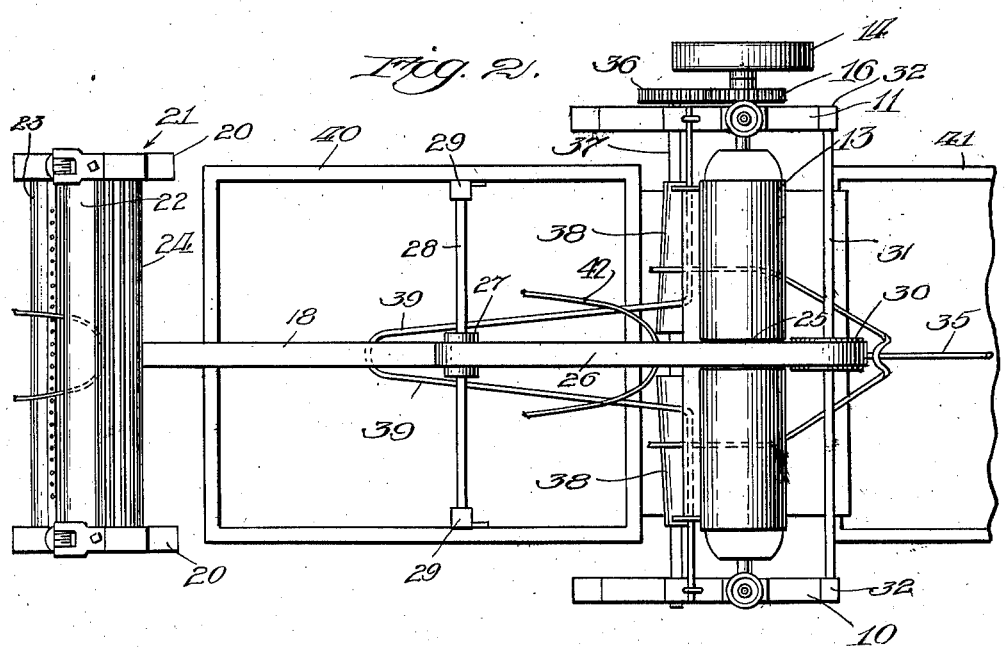
Inventor:
Garrett Pardekooper Aug. 9, 1938.                G. PARDEKOOPER                2,125,950
                          CASING STRIPPING MACHINE
                          Filed July 7, 1934        2 Sheets-Sheet 2
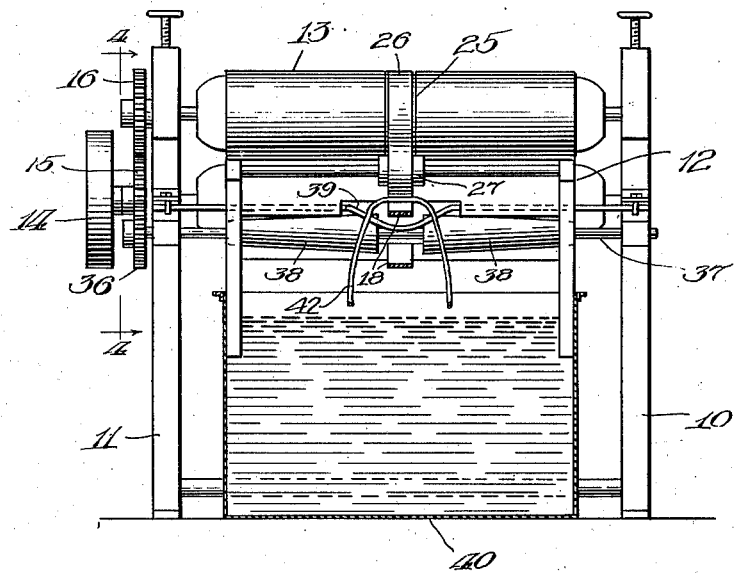
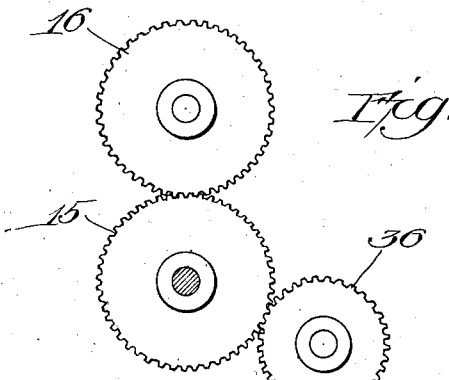
Inventor;
Garrett Pardekooper.

Patented Aug. 9, 1938

2,125,950

UNITED STATES PATENT OFFICE 2,125,950

CASING-STRIPPING MACHINE

Garrett Pardekooper, Ottumwa, Iowa, assignor to Oppenheimer Casing Company, Chicago, Ill., a corporation of Illinois Application July 7, 1934, Serial No. 734,225

21 Claims. (Cl. 17—43)

My invention relates to casing stripping machines which are utilized to remove from animal casing the mucus and fat that have been loosened by passage of the casing through a crushing machine, preliminary to the final conditioning of these casings for sausages, bolognas and the like.

One object of my invention is to devise a casing stripping machine having a mechanism adapted to feed the casings to the cooperating rolls thereof, a portion of the mechanism being operatively associated with a crushing machine whereby the casings are automatically delivered from the latter machine to the mechanism and thence to the stripper without requiring manual intervention of any kind.

A further object is to provide a machine of the character indicated in which the feeding mechanism definitely grips the casings during their passage to the stripping machine and retains this grip until the casings are caught by the cooperating stripping rolls.

A further object is to devise an attachment for a stripping machine comprising a conveyor which transmits the casings singly from the crusher to the stripper and a mechanism which cooperates with the conveyor to grip the casings in advance of their reaching the stripping rolls to thereby insure that the casings will be carried between the latter rolls.

A further object is to provide a stripping machine in which the centered portions of successive casings are fed between the stripping rolls intermediate the ends thereof and the trailing portions of the casings are carried across the breast of the rolls while being drawn therebetween to prevent interference with following casings.

These and further objects of my invention will be set forth in the following specification, reference being had to the accompanying drawings, and the novel means by which said objects are effectuated will be definitely pointed out in the claims.

In the drawings:

Figure 1 is a side elevation of my improved casing stripping machine.

Figs. 2 and 3 are plan and end views of the machine, as viewed in the direction of the arrows 2 and 3 in Fig. 1, respectively.

Fig. 4 is a section along the line 4—4 in Fig. 3, looking in the direction of the arrows, and showing the gear train for driving the squeezing rolls and the shaft which carries the distributing rolls.

Referring to the drawings, the numerals 10 and 11 designate the standards of the stripping machine frame between which are bridged the rotatable, squeezing rolls 12 and 13 of customary construction. Any desired arrangement may be provided for effecting the necessary position of these rolls with respect to each other in order to secure the desired squeezing action of the casings while being drawn therebetween.

The shaft on which the roll 12 is mounted extends outwardly of the standard 11 and has secured thereto a pulley 14 that may be driven in any approved manner. The same shaft has also secured thereto a gear 15 which meshes with a gear 16 secured to the shaft forming a part of the roll 13, thereby insuring that the cooperating portions of the squeezing rolls will rotate in the same direction. The squeezing rolls possess the same diameter and are driven at the same rotative speed, so that the indicated cooperating portions thereof will also move at the same speed and hence will prevent any dragging action of the rolls on the casings while being drawn therebetween.

An annular channel 17 encircles the squeezing roll 12 intermediate the ends thereof and operating in this channel is an endless belt 18 which also passes over a pulley 19 that is preferably carried by a frame 20 forming part of the usual crushing machine 21. This machine is provided with the customary feeding rolls 22 and 23, and also a crushing roll 24. The purpose of providing the pulley 19 on the crushing machine is to eliminate manual handling of the casings while being transferred from the casing machine to the stripping machine, the casings being deposited on the belt 18 as they issue from between the feeding and crushing rolls 23 and 24, respectively, and being thereby automatically carried to the squeezing rolls 12 and 13.

An annular channel 25, similar to the channel 17, encircles the roll 13 in substantial registration with the channel 17, and operating in the channel 25, but only contacting the upper and lower portions of the roll 13, as clearly shown in Fig. 1, is an endless belt 26 which, at one end thereof passes around an idler pulley 27 that is mounted on a shaft 28 carried in a pair of standards 29 which extend upwardly from the tank 40. The opposite end of the belt 26 passes around an idler pulley 30 that is mounted on a shaft 31 carried by a pair of standards 32 provided on the frames 10 and 11, respectively.

Preferably, the pulley 30 is located slightly below the upper squeezing roll 13 to thereby provide a downwardly and outwardly directed belt portion 33 which serves to direct, in connection with a guide 34, delivered casings on to the usual collecting hook 35. The lower disposition of the pulley 30 also insures that the belt 26 will contact with a sufficient portion of the upper part of the upper squeezing roll to insure such a degree of frictional contact therewith as will effect a movement of the belt 26 when the squeezing roll 13 is rotated.

This frictional drive of the belt 26 is somewhat enhanced by a rather close contact of the adjacent portions of the belts 26 and 18, as shown in Fig. 1, it being understood that this contact is not so intensive, in conjunction with the natural sag of the upper portion of the belt 18, to prevent casings that are being carried by the upper portion of the belt 18 from passing between the cooperating portions of the belts 18 and 26.

The gear 15 also meshes with a gear 36 that is fixed to a shaft 37 which is rotatably mounted in and extends between the uprights 10 and 11. Accordingly, the shaft 37 and the lower squeezing roll 12 will rotate in opposite directions, the roll 12, for example, rotating in a clockwise direction, while the shaft 37 rotates in a counterclockwise direction. A pair of tapered, distributing rolls 38 are fixed to the shaft 37 on opposite sides of the belt 18, respectively (see Fig. 2), and operating in conjunction with these distributing rolls is a V-shaped guide frame 39 whose ends are outwardly extended for support in the standards 10 and 11. The closed end of the frame 39 is located somewhat in advance of the pulley 27 for a purpose presently explained.

Since it is contemplated that my improved attachment for the stripping machine will ordinarily be used in conjunction with the usual crusher which loosens the mucus and fat adhering to the casings, it will be understood that the casings 42 are first fed into the crushing machine with their center or intermediate portions in advance of their trailing strands in accordance with standard practice. Accordingly, the first portion of each casing to be deposited on the belt 18 will be the intermediate part thereof after passage between the feeding and crushing rolls 23 and 24, respectively.

This intermediate part of any one casing, for example, will thereupon move toward the right, as viewed in Fig. 1, with the trailing portions thereof eventually being deposited in the usual water tank 40 where the casings are subjected to a temporary soaking action.

The casing under consideration eventually reaches a point where the intermediate part thereof passes beneath the pulley 27 and thereafter becomes subject to the frictional pull exerted by the cooperating portions of the belts 18 and 26. It is this frictional drag which serves to pull the casings through the water in the tank and to draw the intermediate part of each casing between the squeezing rolls 12 and 13, but after once being inserted between these rolls, the latter thereafter serve to pull the remaining portions of the indicated casing therebetween and to squeeze the loosened material therefrom.

When the intermediate part of each casing passes beneath the pulley 27, its trailing portions have already begun to be spread apart by riding along the outer surfaces of the guide frame 39 in order to insure their subsequent contact with the surfaces of the distributing rolls 38. Since these latter rolls are operating in the opposite direction to the squeezing roll 12, there will be exerted on each trailing casing portion a slight frictional drag which, in conjunction with the tapered shape of the distributing rolls, insures a gradual movement of the trailing casing portions across the breast of the squeezing roll 12 and hence prevents any entangling of the indicated casing portions with following casings.

After being delivered through the squeezing rolls, the intermediate part of each casing falls down onto the usual collecting hook 35 and the trailing portions of each casing are deposited into a tank 41. It will be understood that the depth of the annular channels 17 and 25 bears such a relation to the thicknesses of the belts 18 and 26 that the squeezing surfaces of the rolls 12 and 13 are substantially continuous.

I claim:

1. A casing stripping machine comprising in combination, a pair of cooperating squeezing rolls, conveying means for successively delivering the casings into squeezing relation to the rolls, the rolls thereafter operating to draw the trailing casing portions therebetween, and means for moving the trailing portions in opposite directions across the face of one of the rolls to prevent entanglement with following casings.

2. A casing stripping machine comprising in combination, a pair of cooperating squeezing rolls, conveying means for successively delivering the intermediate parts of casings into squeezing relation to the intermediate portions of the rolls, the other portions of each casing trailing on opposite sides of the conveying means and the rolls operating to draw the casings therebetween, and means on opposite sides of the conveying means for moving the trailing casing portions in opposite directions across the face of one of the rolls to prevent entanglement with following casings.

3. A casing stripping machine comprising in combination, upper and lower cooperating squeezing rolls, conveying means for successively delivering the intermediate parts of casings into squeezing relation to the intermediate portions of the rolls, the other portions of each casing trailing on opposite sides of the conveying means and the rolls operating to draw the casings therebetween, and roll means adjacent the lower squeezing roll having portions tapering outwardly from the conveying means and operating to move the trailing casing portions across the face of the lower squeezing roll to prevent entanglement with following casings.

4. A casing stripping machine comprising in combination, upper and lower cooperating squeezing rolls, conveying means for successively delivering the intermediate parts of casings into squeezing relation to the intermediate portions of the rolls, the other portions of each casing trailing on opposite sides of the conveying means and the rolls operating to draw each casing therebetween, and roll means adjacent the lower roll having portions tapering outwardly from the conveying means and rotating opposite to the direction of rotation of the lower squeezing roll to thereby move the trailing casing portions across the face of the lower squeezing roll to prevent entanglement with the following casings.

5. A casing stripping machine comprising in combination, a pair of cooperating squeezing rolls having registering, annular channels intermediate their ends, an endless conveyor belt operating in one channel and over a remotely positioned roll, the intermediate portions of the casings being delivered onto the belt with the remaining portions trailing on opposite sides of the belt, and a second endless belt operating in the other channel and over an idler roll located to cause the second belt to gently grip the intermediate casing portions at a point spaced from the squeezing rolls to draw them between the rolls, the depth of the channels being such that the coacting belt surfaces are substantially flush with the cooperating surfaces of the squeezing rolls.

6. A casing stripping machine comprising in combination, a pair of cooperating squeezing rolls having registering, annular channels intermediate their ends, an endless conveyor belt operating in one channel and over a remotely positioned roll, the intermediate portions of the casings being delivered onto the belt with the remaining portions trailing on opposite sides of the belt, a second endless belt operating in the other channel and over an idler roll located to cause the second belt to gently grip the intermediate casing portions at a point spaced from the squeezing rolls to draw them between the rolls, the depth of the channels being such that the coacting belt surfaces are substantially flush with the cooperating surfaces of the squeezing rolls, and means for moving the trailing portions across the face of one of the rolls to prevent entanglement with following casings.

7. A casing stripping machine comprising in combination, a pair of cooperating squeezing rolls having registering, annular channels intermediate their ends, an endless conveyor belt operating in one channel and over a remotely positioned roll, the intermediate portions of the casings being delivered onto the belt with the remaining portions trailing on opposite sides of the belt, a second endless belt operating in the other channel and over an idler roll located to cause the second belt to gently grip the intermediate casing portions at a point spaced from the squeezing rolls to draw them between the rolls, the depth of the channels being such that the coacting belt surfaces are substantially flush with the cooperating surfaces of the squeezing rolls, and roll means adjacent the lower squeezing roll having portions tapering outwardly from the conveyor belt and operating to move the trailing casing portions across the face of the lower squeezing roll to prevent entanglement with following casings.

8. A casing stripping machine comprising in combination, a pair of cooperating squeezing rolls having registering, annular channels intermediate their ends, an endless conveyor belt operating in one channel and over a remotely positioned roll, the intermediate portions of the casings being delivered onto the belt with the remaining portions trailing on opposite sides of the belt, a second endless belt operating in the other channel and over an idler roll located to cause the second belt to gently grip the intermediate casing portions at a point spaced from the squeezing rolls to draw them between the rolls, the depth of the channels being such that the coacting belt surfaces are substantially flush with the cooperating surfaces of the squeezing rolls, roll means adjacent the lower squeezing rolls having portions tapering outwardly from the conveyor belt and operating to move the trailing casing portions across the face of the lower squeezing roll to prevent entanglement with following casings, and guide means for directing the trailing casing portions onto the roll means.

9. In a machine for loosening and removing mucus, fat and the like from animal intestines, the combination of crushing rolls between which the centered casings are passed to loosen the removable material, an idler roll adjacent the delivery side of the crushing rolls, a pair of cooperating squeezing rolls, an endless conveyor belt operating over the idler roll and one of the squeezing rolls and onto which the intermediate portions of the casings are delivered from the crushing rolls, and a second belt operating over the other squeezing roll and in light contact with a substantial length of the supporting portion of the conveyor belt, the cooperating belt portions gently gripping the intermediate casing portions and drawing the casings into squeezing relation with the squeezing rolls.

10. In a machine for stripping deleterious material from animal casings, the combination of a pair of cooperating squeezing rolls, means adapted to grip each casing at a substantial distance from the rolls and to carry the casings into squeezing relation to the rolls while maintaining the grip, and means for moving the gripping means.

11. In a machine for stripping deleterious material from animal casings, the combination of a pair of cooperating squeezing rolls, a narrow, endless conveyor belt operating over a portion of one of the rolls and onto which intermediate portions of casings are successively delivered for carriage to the rolls, the remaining casing portions trailing on opposite sides of the belt, a second belt cooperating with the conveyor belt and extending between the rolls, the belts acting to grip the intermediate casing portions at a substantial distance from the rolls and to maintain the grip while carrying the casings into squeezing relation to the rolls, and means for moving the belts at substantially the same speed.

12. In a machine for stripping deleterious material from animal casings, the combination of a pair of cooperating squeezing rolls, a narrow, endless conveyor belt operating over a portion of one of the rolls and onto which intermediate portions of casings are successively delivered for carriage to the rolls, the remaining casing portions trailing on opposite sides of the belt, a second belt having a portion for cooperating with a portion of the conveyor belt, the cooperating portions extending between the rolls and acting to grip the intermediate casing portions at a substantial distance from the rolls and to maintain the grip while carrying the casings into squeezing relation to the rolls, and means for moving the belts at substantially the same speed.

13. In a machine for stripping deleterious material from animal casings, the combination of a pair of cooperating squeezing rolls, a narrow, endless conveyor belt operating over a portion of one of the rolls and onto which intermediate portions of casings are successively delivered for carriage to the rolls, the remaining casing portions trailing on opposite sides of the belt, a second belt cooperating with the conveyor belt and extending between the rolls, the belts acting to grip the intermediate casing portions at a substantial distance from the rolls and to maintain the grip while carrying the casings into squeezing relation to the rolls, and a collector for receiving the casings from the rolls, a portion of the second belt on the delivery side of the rolls being located to direct the issuing casings onto the collector.

14. A casing stripping machine comprising in combination, a pair of cooperating squeezing rolls, conveying means for successively delivering the intermediate parts of casings into squeezing relation to the intermediate portions of the rolls, the other portions of each casing trailing on opposite sides of the conveying means and the rolls operating to draw the casings therebetween, means on opposite sides of the conveying means for moving the trailing casing portions in opposite directions across the face of one of the rolls to prevent entanglement with following casings, and guide means for directing the trailing casing portions into contact with said last named means.

15. In a machine for loosening and removing mucus, fat and the like from animal intestines, the combination of crushing rolls between which the centered casings are passed to loosen the removable material, a pair of cooperating squeezing rolls, supporting means adjacent the delivery side of and onto which intermediate portions of the casings are delivered from the crushing rolls, a part adapted to lightly grip the successive casing portions against the supporting means, the cooperating portions of the supporting means and part extending between and drawing the casings into squeezing relation to the rolls, and means for moving the cooperating portions of the supporting means and part together.

16. In a machine for loosening and removing mucus, fat and the like from animal intestines, the combination of crushing rolls between which the centered casings are passed to loosen the removable material, a pair of cooperating squeezing rolls, a conveyor belt adjacent the delivery side of and onto which intermediate portions of the casings are delivered from the crushing rolls, a second belt adapted to lightly grip the successive casing portions against the conveyor belt, the cooperating portions of the belts extending between and drawing the casings into squeezing relation with the rolls, and means for moving the cooperating belt portions at substantially the same speed.

17. A casing stripping machine comprising in combination, a pair of cooperating squeezing rolls, an endless conveyor belt operating over a portion of one of the rolls and over a remotely positioned roll, the intermediate portions of the casing being delivered on to the belt with the remaining portions trailing on opposite sides of the belt, and a second endless belt operating over a portion of the other squeezing roll and over an idler roll located to cause the second belt to gently grip the intermediate casing portions at a point spaced from the squeezing rolls to draw them between the rolls.

18. A casing stripping machine comprising in combination, a pair of cooperating squeezing rolls, an endless conveyor belt operating over a portion of one of the rolls and over a remotely positioned roll, the intermediate portions of the casings being delivered on to the belt with the remaining portions trailing on opposite sides of the belt, a second endless belt operating over a portion of the other squeezing roll and over an idler roll located to cause the second belt to gently grip the intermediate casing portions at a point spaced from the squeezing rolls to draw them between the rolls, and means for moving the trailing portions across the face of one of the squeezing rolls to prevent entanglement with following casings.

19. A casing stripping machine comprising in combination, a pair of cooperating squeezing rolls, an endless conveyor belt operating over a portion of one of the rolls and over a remotely positioned roll, the intermediate portions of the casings being delivered on to the belt with the remaining portions trailing on opposite sides of the belt, a second endless belt operating over a portion of the other squeezing roll and over an idler roll located to cause the second belt to gently grip the intermediate casing portions at a point spaced from the squeezing rolls to draw them between the rolls, and roll means adjacent the lower squeezing roll having portions tapering outwardly from the conveyor belt and operating to move the trailing casing portions across the face of the lower squeezing roll to prevent entanglement with following casings.

20. A casing stripping machine comprising in combination, a pair of cooperating squeezing rolls, an endless conveyor belt operating over a portion of one of the rolls and over a remotely positioned roll, the intermediate portions of the casings being delivered on to the belt with the remaining portions trailing on opposite sides of the belt, a second endless belt operating over a portion of the other squeezing roll and over an idler roll located to cause the second belt to gently grip the intermediate casing portions at a point spaced from the squeezing rolls to draw them between the rolls, roll means adjacent the lower squeezing roll having portions tapering outwardly from the conveyor belt and operating to move the trailing casing portions across the face of the lower squeezing roll to prevent entanglement with following casings, and guide means for directing the trailing casing portions on to the roll means.

21. A casing stripping machine comprising in combination, a pair of cooperating squeezing rolls, an endless conveyor belt operating over a portion of one of the rolls and over a remotely positioned roll, the intermediate portions of the casing being delivered on to the belt with the remaining portions trailing on opposite sides of the belt, a second endless belt operating over a portion of the other squeezing roll and over an idler roll located to cause the second belt to gently grip the intermediate casing portions at a point spaced from the squeezing rolls to draw them between the rolls, and roll means adjacent the lower squeezing roll having portions tapering outwardly from the conveyor belt and rotating oppositely to the direction of rotation of the lower squeezing roll to thereby move the trailing casing portions across the face of the lower squeezing roll to prevent entanglement with following casings.

GARRETT PARDEKOOPER.